United States Patent
Kelkar et al.

(10) Patent No.: US 12,067,046 B2
(45) Date of Patent: Aug. 20, 2024

(54) EXPLORATION OF LARGE-SCALE DATA SETS

(71) Applicant: ADOBE INC., San Jose, CA (US)

(72) Inventors: Sachin Madhav Kelkar, Santa Clara, CA (US); Ajinkya Gorakhnath Kale, San Jose, CA (US); Alvin Ghouas, Berkeley, CA (US); Baldo Antonio Faieta, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 20 days.

(21) Appl. No.: 17/932,742

(22) Filed: Sep. 16, 2022

(65) Prior Publication Data

US 2024/0095277 A1    Mar. 21, 2024

(51) Int. Cl.
G06F 16/54 (2019.01)
G06V 10/22 (2022.01)
G06V 10/772 (2022.01)

(52) U.S. Cl.
CPC .............. *G06F 16/54* (2019.01); *G06V 10/23* (2022.01); *G06V 10/772* (2022.01)

(58) Field of Classification Search
None
See application file for complete search history.

(56) References Cited

U.S. PATENT DOCUMENTS

| | | | | |
|---|---|---|---|---|
| 11,613,218 | B2 * | 3/2023 | Tseng | B60N 2/0244 |
| | | | | 701/49 |
| 11,860,932 | B2 * | 1/2024 | Maheshwari | G06F 16/5854 |
| 2022/0185210 | A1 * | 6/2022 | Tseng | B60R 21/01516 |
| 2022/0391433 | A1 * | 12/2022 | Maheshwari | G06N 3/0464 |
| 2022/0414453 | A1 * | 12/2022 | Chu | G06N 3/061 |
| 2023/0074706 | A1 * | 3/2023 | Xiao | G06N 3/0464 |
| 2024/0095277 | A1 * | 3/2024 | Kelkar | G06V 10/772 |

OTHER PUBLICATIONS

1 Barthel, et al., "Visually Exploring Millions of Images using Image Maps and Graphs", in "Big Data Analytics for Large-Scale Multimedia Search", John Wiley & Sons, Inc., New Jersey, ISBN 9781119376972, Mar. 15, 2019, pp. 289-315, available at https://onlinelibrary.wiley.com/doi/10.1002/9781119376996.ch11.

2Kleiman, et al., "DynamicMaps: Similarity-based Browsing through a Massive Set of Images", in CHI '15: Proceedings of the 33rd Annual ACM Conference on Human Factors in Computing Systems, Apr. 18, 2015, 10 pages.

3Strong, et al., "Self-Sorting Map: An Efficient Algorithm for Presenting Multimedia Data in Structured Layouts", in IEEE Transactions on Multimedia, vol. 16, No. 4, Jun. 2014, pp. 1045-1058, 14 pages.

* cited by examiner

*Primary Examiner* — Kim T Nguyen
(74) *Attorney, Agent, or Firm* — F. CHAU & ASSOCIATES, LLC

(57) ABSTRACT

Systems and methods for image exploration are provided. One aspect of the systems and methods includes identifying a set of images; reducing the set of images to obtain a representative set of images that is distributed throughout the set of images by removing a neighbor image based on a proximity of the neighbor image to an image of the representative set of images; arranging the representative set of images in a grid structure using a self-sorting map (SSM) algorithm; and displaying a portion of the representative set of images based on the grid structure.

20 Claims, 11 Drawing Sheets

EXPLORATION OF LARGE-SCALE DATA SETS

BACKGROUND

The following relates to exploration of large-scale image sets. Image exploration may involve collecting a set of images for downstream tasks, such as image annotation and image selection for graphic design projects, and displaying the collected set of images in a user interface.

However, conventional image exploration techniques may not organize the set of images in a user interface in a manner that is easily navigable by a user, or may use organization techniques that are impractical when they are applied to a large-scale image set. There is therefore a need in the art for systems and methods that provide a computationally practical and intuitively navigable exploration of large-scale image sets.

SUMMARY

Embodiments of the present disclosure provide systems and methods for exploring an image set by reducing a set of images to obtain a representative set of images, arranging the representative set of images according to a grid structure, and displaying a portion of the representative set of images. According to some aspects, the systems and methods reduce the set of images by removing neighbor images of the representative set of images, where the representative set of images is distributed among the set of images. Accordingly, the system provides a reduced set of images that accurately represents a larger original set of images and that can be more easily organized and displayed to a user than the original set of images.

A method, apparatus, non-transitory computer readable medium, and system for exploration of large-scale image sets are described. One or more aspects of the method, apparatus, non-transitory computer readable medium, and system include identifying a set of images; reducing the set of images to obtain a representative set of images that is distributed throughout the set of images by removing a neighbor image based on a proximity of the neighbor image to an image of the representative set of images; arranging the representative set of images in a grid structure using a self-sorting map (SSM) algorithm; and displaying a portion of the representative set of images based on the grid structure.

A method, apparatus, non-transitory computer readable medium, and system for exploration of large-scale image sets are described. One or more aspects of the method, apparatus, non-transitory computer readable medium, and system include identifying a set of images; reducing the set of images to obtain a representative set of images; arranging the representative set of images in a grid structure using a self-sorting map (SSM) algorithm; displaying a portion of the representative set of images based on the grid structure; receiving a navigation input corresponding to an image of the representative set of images; identifying a set of neighbor images of the image from among the set of images, wherein at least one image in the set of neighbor images is not included in the representative set of images; arranging the set of neighbor images in a second grid structure based on the navigation input; and displaying the set of neighbor images based on the second grid structure.

An apparatus and system for exploration of large-scale image sets are described. One or more aspects of the apparatus and system include a processor; a memory storing instructions executable by the processor; a reduction component configured to identify a set of images and to reduce the set of images to obtain a representative set of images by removing a neighbor image based on a proximity of the neighbor image to an image of the representative set of images; a sorting component configured to arrange the representative set of images in a grid structure using a self-sorting map (SSM) algorithm; and a user interface configured to display a portion of the representative set of images based on the grid structure and to receive a navigation input, wherein the portion of the representative set of images is displayed based on the navigation input.

DETAILED DESCRIPTION

Figure 1:
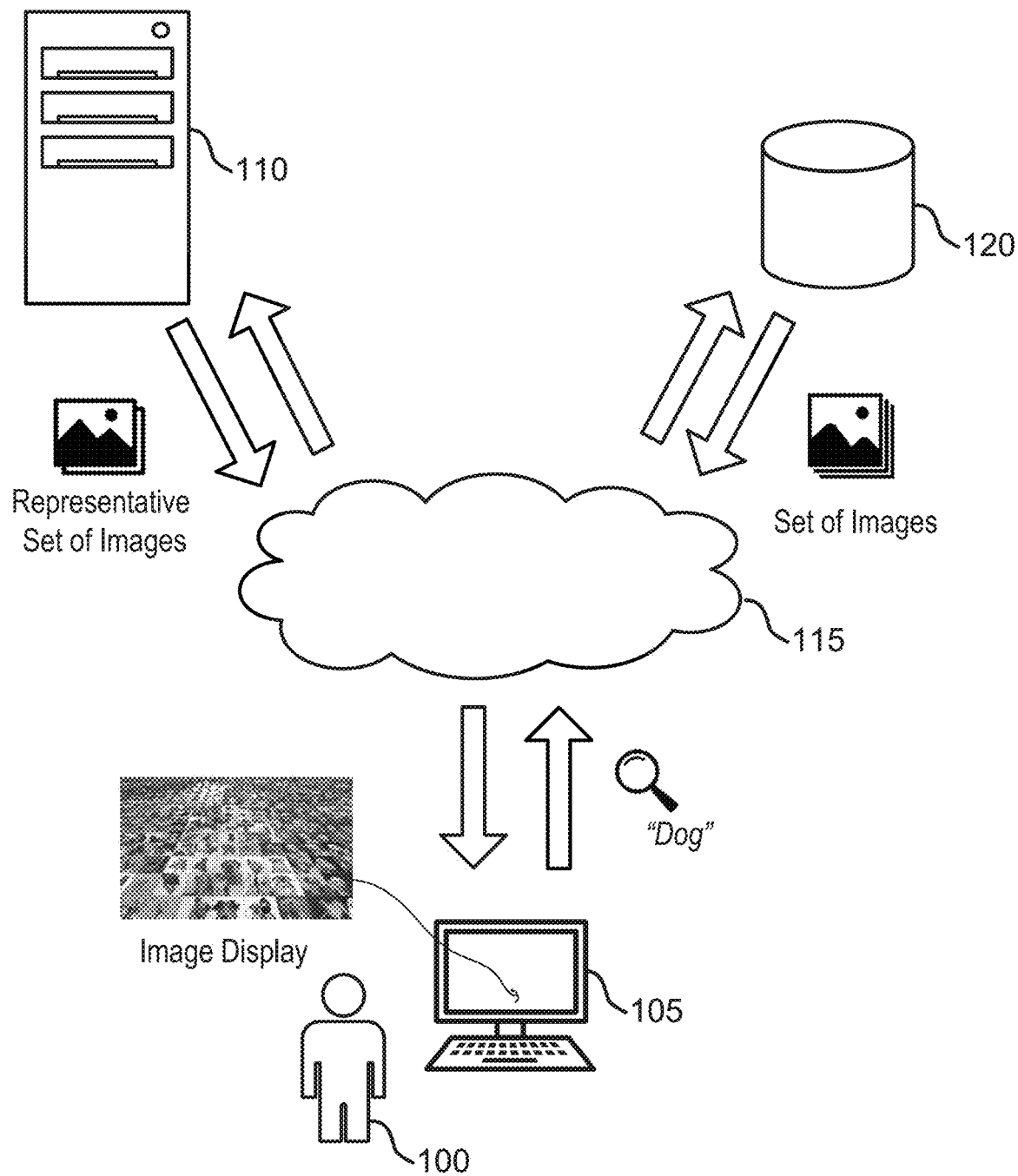
FIG. 1 shows an example of an image exploration system according to aspects of the present disclosure.

The following relates to exploration of large-scale image sets. Image exploration may involve collecting a set of images for downstream tasks, such as image annotation and image selection for graphic design projects, and displaying the collected set of images in a user interface.

However, conventional image exploration techniques may not organize the set of images in a user interface in a manner that is easily navigable by a user, or may use organization techniques that are impractical when they are applied to a large-scale image set (e.g., an image set including a large number of images).

For example, conventional techniques may organize a set of images according to various algorithms and structures, producing an organized set of images that can be displayed to a user. However, these conventional techniques do not ensure that the organized set of images is representative of the original set of images from which the organized set of images is derived, and may therefore affect the quality of a downstream task by failing to include important images in the organized set of images, or inaccurately representing the variety of the images in the original set of images.

According to some aspects, a system includes a reduction component, a sorting component, and a user interface. In some embodiments, the reduction component identifies a set of images and reduces the set of images to obtain a representative set of images that is distributed throughout the set of images by removing a neighbor image based on a proximity of the neighbor image to an image of the representative set of images. In some embodiments, the sorting component arranges the representative set of images in a structured layout, for example, a grid structure, using a self-sorting map (SSM) algorithm. In some embodiments, the SSM algorithm arranges the representative set of images such that a proximity between a pair of images positively corresponds to a similarity between the pair of images. For example, in some cases, the SSM algorithm places each image into a cell of the grid structure such that similar images are placed in proximity to each other and dissimilar images are spaced apart from each other. In some embodiments, the user interface displays a portion of the representative set of images based on the grid structure.

In contrast to conventional techniques, by removing neighbor images of a representative images that is distributed throughout a set of images to obtain the representative set of images, embodiments of the present disclosure provide a user with an organized set of images that accurately represents the variety of the set of images and helps to minimize a chance that an important picture is omitted from the organized set of images. Furthermore, by reducing the set of images to obtain the representative set of images, embodiments of the present disclosure provide an organized set of images that can be further organized according to a grid structure that would be computationally impractical to determine according to conventional techniques if the set of images is of a sufficiently large scale. According to some aspects, as similar images are consequently displayed on a user interface as being proximate to each other and dissimilar images are displayed as being distant to each other, a user may quickly identify and select images that include a desired characteristic for downstream tasks, such as image annotation.

According to some aspects, the user interface receives a navigation input corresponding to an image of the representative set of images and the reduction component identifies a set of neighbor images of the image from among the set of images. In some embodiments, at least one image in the set of neighbor images is not included in the representative set of images. According to some aspects, the sorting component arranges the set of neighbor images in a second grid structure based on the navigation input, and the user interface displays the arranged set of neighbor images based on the second grid structure. Accordingly, some aspects of the present disclosure provide a dynamically generated grid of neighbor images in response to a user input, allowing a user to view an additional image that is included in the set of images but not in the representative set of images, thereby allowing the user to dynamically explore the set of images with a greater degree of granularity.

According to some aspects, the system identifies representative images of the representative set of images, and the user interface displays the representative images according to an additional grid structure, thereby allowing a user to explore multiple levels of image arrangements including greater and lesser numbers of images, providing the user with the ability to explore the representative set of images with greater and lesser degrees of granularity.

An embodiment of the present disclosure is used in an image searching context. In an example, the system reduces a set of images to obtain a representative set of images and arranges the representative set of images according to a grid structure. The system receives a user input (e.g., a query) and displays a portion of the representative set of images based on the grid structure in response to the query. In some embodiments, the portion of the representative set of images includes an image that matches or is similar to the query, as well as images that are similar to the image. In some aspects, the user can pan the display of the representative set of images to view a different portion of the representative set of images. In some embodiments, the user can navigate multiple levels of grid structures to view images of the representative set of images that are increasingly similar or dissimilar to the image, thereby allowing a user to quickly navigate to a different portion of the representative set of images that interests the user and to view a greater number of images that are similar to an image included in the different portion of the representative set of images. Example applications of the present disclosure in the image searching context are provided with reference to FIGS. 1 and 4. Details regarding the architecture of the system are provided with reference to FIGS. 1-3. Examples of a process for image exploration are provided with reference to FIGS. 4-11.

Image Exploration System

A system and apparatus for exploration of large-scale image sets is described with reference to FIGS. 1-3. One or more aspects of the system and apparatus include a processor; a memory storing instructions executable by the processor; a reduction component configured to identify a set of images and to reduce the set of images to obtain a representative set of images by removing a neighbor image based on a proximity of the neighbor image to an image of the representative set of images; a sorting component configured to arrange the representative set of images in a grid structure using a self-sorting map (SSM) algorithm; and a user interface configured to display a portion of the representative set of images based on the grid structure and to receive a navigation input, wherein the portion of the representative set of images is displayed based on the navigation input.

FIG. 1 shows an example of an image exploration system according to aspects of the present disclosure. The example shown includes user 100, user device 105, image exploration apparatus 110, cloud 115, and database 120.

Referring to FIG. 1, according to some aspects, image exploration apparatus 110 retrieves a set of images from database 120 and reduces the set of images by removing neighbor images of a representative set of images to obtain the representative set of images. According to some aspects, the representative set of images includes images that are distributed among the set of images. In some embodiments, the representative set of images is evenly distributed across the set of images (for example, as determined according to random selection, selection from a representative region of a space corresponding to the set of images, a spacing metric, graph node spacing, etc). According to some aspects, image exploration apparatus 110 organizes the representative set of images according to a grid structure. In some embodiments, image exploration apparatus 110 determines the grid structure according to a self-sorting map (SSM) algorithm. According to some aspects, image exploration apparatus 110 receives a user query (such as "dog") from user 100 via user device 105 and displays a portion of the representative set of images based on the grid structure in response to the query via a user interface and user device 105.

According to some aspects, user device 105 is a personal computer, laptop computer, mainframe computer, palmtop computer, personal assistant, mobile device, or any other suitable processing apparatus. In some examples, user device 105 includes software that allows user 100 to provide a query and other inputs to image exploration apparatus 110, and displays images to user 100.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, the user interface may be a graphical user interface (GUI). According to some aspects, the user interface is included in image exploration apparatus 110, and user 100 interacts directly with image exploration apparatus 110 via the user interface. According to some aspects, the user interface is provided by image exploration apparatus 110 via user device 105, and user 100 interacts with image exploration apparatus 110 via the user interface.

According to some aspects, the user interface allows user 100 to traverse a display of images via various inputs, such as navigation inputs, panning inputs, etc. as described with reference to FIGS. 5-11. For example, in some embodiments, user 100 may pan a display of a portion of the representative set of images, may zoom in or out of a current display to see a respectively reduced or expanded portion of representative images of the representative set of images, may provide a navigation input to view a set of neighbor images of a representative image, may bookmark an image to easily return to a display of the image, may view a minimap corresponding to the currently displayed images, may enlarge an image, may select one or more images for annotation, or a combination thereof. According to some aspects, the user interface is presented via a web browser or other software application included in user device 105 and/or image exploration apparatus 110. According to some aspects, the user interface interacts with components of image exploration apparatus 110 and/or database 120 via API calls. According to some aspects, the API calls are provided and received via cloud 115.

According to some aspects, image exploration apparatus 110 includes a computer implemented network. In some embodiments, the computer implemented network includes one or more artificial neural networks (ANNs). In some embodiments, image exploration apparatus 110 also includes one or more processors, a memory subsystem, a communication interface, an I/O interface, one or more user interface components, and a bus. In some embodiments, image exploration apparatus 110 communicates with user device 105 and database 120 via cloud 115.

In some cases, image exploration apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP) and simple mail transfer protocol (SMTP), although other protocols such as file transfer protocol (FTP) and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus. Image exploration apparatus 110 is an example of, or includes aspects of, the corresponding element described with reference to FIG. 2.

Figure 2:
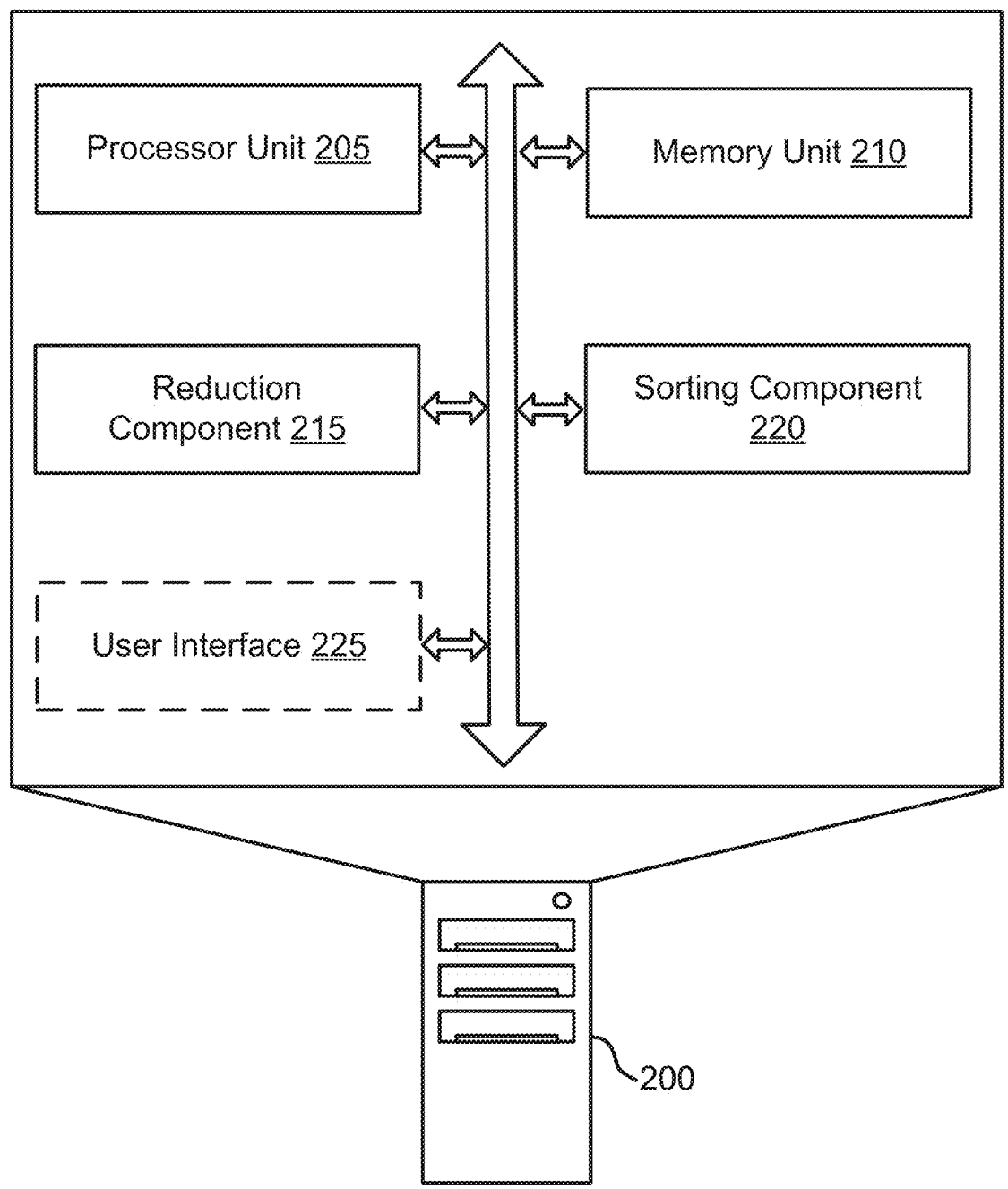
FIG. 2 shows an example of an image exploration apparatus according to aspects of the present disclosure.
Figure 3:
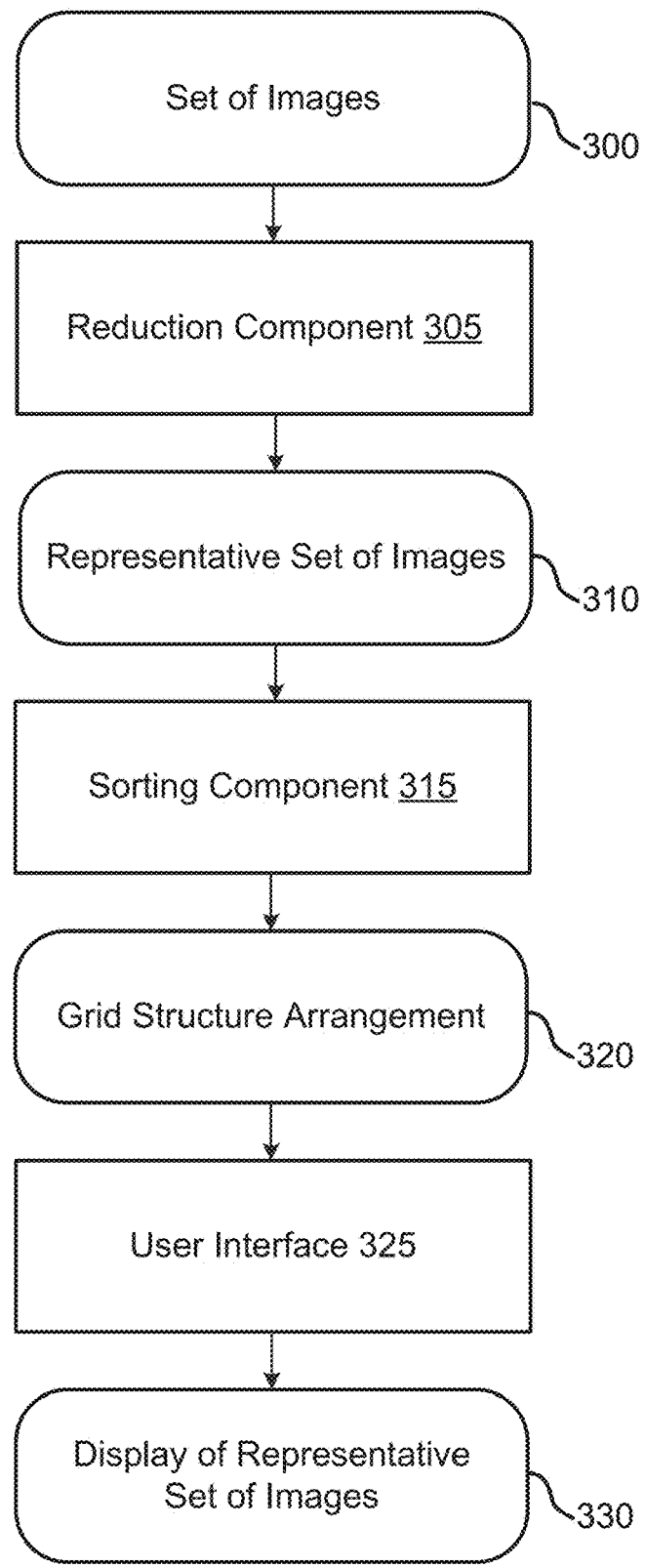
FIG. 3 shows an example of data flow in an image exploration apparatus according to aspects of the present disclosure.

Further detail regarding the architecture of image exploration apparatus 110 is provided with reference to FIGS. 2-3. Further detail regarding a process for image exploration is provided with reference to FIGS. 4-11.

According to some aspects, cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, image exploration apparatus 110, and database 120.

According to some aspects, database 120 is an organized collection of data. In some embodiments, database 120 stores data in a specified format known as a schema. According to some aspects, database 120 is structured as a single database, a distributed database, multiple distributed databases, an emergency backup database, or a combination thereof. In some cases, a database controller manages data storage and processing in database 120. In some cases, user 100 interacts with the database controller. In other cases, the database controller operates automatically without user interaction. According to some aspects, database 120 stores a set of images, outputs of various components of image exploration apparatus 110 (such as a graph, the representative set of images, a grid structure, representative images of the representative set of images, a nearest neighbor index, a set of neighbor images, image embeddings, etc.) as described with reference to FIGS. 5-11, or a combination thereof. In some aspects, database 120 is external to image exploration apparatus 110 and communicates with image exploration apparatus 110 via cloud 115. In some embodiments, database 120 is included in image exploration apparatus 110.

FIG. 2 shows an example of an image exploration apparatus according to aspects of the present disclosure. Image exploration apparatus 200 is an example of, or includes aspects of, the corresponding element described with reference to FIG. 1. In one aspect, image exploration apparatus 200 includes processor unit 205, memory unit 210, reduction component 215, sorting component 220, and user interface 225.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, reduction component 215 identifies a set of images. In some examples, reduction component 215 reduces the set of images to obtain a representative set of images that is distributed throughout the set of images by removing a neighbor image based on a proximity of the neighbor image to an image of the representative set of images.

In some examples, reduction component 215 identifies a set of neighbor images of the image from among the set of images, where at least one image in the set of neighbor images is not included in the representative set of images. In some examples, reduction component 215 embeds the set of images to obtain an embedded set of images. In some examples, reduction component 215 adds the embedded set of images to a nearest neighbor index. In some examples, reduction component 215 identifies the set of neighbor images based on the nearest neighbor index.

In some examples, reduction component 215 identifies a set of subsets of the representative set of images. In some examples, reduction component 215 selects a representative image from each of the set of subsets of the representative set of images. In some examples, reduction component 215 identifies a centroid for each of the set of subsets of the representative set of images. In some examples, reduction component 215 selects the representative image based on the centroid.

In some examples, reduction component 215 generates a graph of the set of images. In some examples, reduction component 215 removes the neighbor image based on the graph. In some examples, reduction component 215 generates an image embedding for each of the set of images, where the graph is based on the embedding. In some examples, reduction component 215 computes a length of an edge of the graph between the image and the neighbor image, where the proximity is based on the length of the edge.

In some aspects, the proximity is determined according to a self-organizing map algorithm. In some examples, reduction component 215 computes the proximity of the image to the neighbor image using a nearest neighbor algorithm. In some aspects, the representative set of images is evenly distributed across the set of images.

According to some aspects, reduction component 215 identifies a set of images. In some examples, reduction component 215 reduces the set of images to obtain a representative set of images. In some examples, reduction component 215 identifies a set of neighbor images of the image from among the set of images, where at least one image in the set of neighbor images is not included in the representative set of images. In some examples, reduction component 215 removes a neighbor image based on a proximity of the neighbor image to an image of the representative set of images, where the representative set of images is distributed throughout the set of images.

According to some aspects, reduction component 215 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, reduction component 215 is configured to identify a set of images and to reduce the set of images to obtain a representative set of images by removing a neighbor image based on a proximity of the neighbor image to an image of the representative set of images.

According to some aspects, reduction component 215 is implemented as one or more hardware circuits, as firmware, as software stored in memory of memory unit 210 and executed by a processor of processor unit 205, or as a combination thereof. Reduction component 215 is an example of, or includes aspects of, the corresponding element described with reference to FIG. 3.

According to some aspects, sorting component 220 arranges the representative set of images in a grid structure using a self-sorting map (SSM) algorithm. In some examples, sorting component 220 arranges the set of neighbor images in a second grid structure based on a navigation input.

In some examples, sorting component 220 identifies a first edge of the grid structure and a second edge of the grid structure opposite to the first edge in a first direction. In some examples, sorting component 220 connects the first edge and the second edge to enable continuous navigation around the grid structure in the first direction. In some examples, sorting component 220 identifies a third edge of the grid structure and a fourth edge of the grid structure opposite to the third edge in a second direction. In some examples, sorting component 220 connects the third edge and the fourth edge to enable continuous navigation around the grid structure in the second direction.

According to some aspects, sorting component 220 is configured to arrange the representative set of images in a grid structure using a self-sorting map (SSM) algorithm. According to some aspects, sorting component 220 is implemented as one or more hardware circuits, as firmware, as software stored in memory of memory unit 210 and executed by a processor of processor unit 205, or as a combination thereof. Sorting component 220 is an example of, or includes aspects of, the corresponding element described with reference to FIG. 3.

According to some aspects, user interface 225 displays a portion of the representative set of images based on the grid structure. In some examples, user interface 225 receives a navigation input corresponding to an image of the representative set of images. In some examples, user interface 225 displays the set of neighbor images based on the second grid structure.

In some examples, user interface 225 includes the representative image from each of the set of subsets of the representative set of images in a second grid structure. In some examples, user interface 225 receives a navigation input. In some examples, user interface 225 displays the representative images based on the second grid structure in response to the navigation input.

In some examples, user interface 225 displays the representative images based on the second grid structure in response to the navigation input. In some examples, user interface 225 determines a location identifier, where the portion of the representative set of images is displayed based on the location identifier. In some examples, user interface 225 assigns a bookmark to the location identifier at a first time. In some examples, user interface 225 displays the portion of the representative set of images at a second time after the first time based on the bookmark. In some examples, user interface 225 generates a minimap for the representative set of images. In some examples, user interface 225 displays a navigation position of the location identifier in the minimap.

According to some aspects, user interface 225 displays a portion of the representative set of images based on the grid structure. In some examples, user interface 225 receives a navigation input corresponding to an image of the representative set of images. In some examples, user interface 225 displays the set of neighbor images based on the second grid structure.

According to some aspects, user interface 225 is configured to display a portion of the representative set of images based on the grid structure and to receive a navigation input, wherein the portion of the representative set of images is displayed based on the navigation input. According to some aspects, user interface 225 is implemented as one or more hardware circuits, as firmware, as software stored in memory of memory unit 210 and executed by a processor of processor unit 205, or as a combination thereof.

According to some aspects, user interface 225 is omitted from image exploration apparatus 200 and is included in a user device such as the user device described with reference to FIG. According to some aspects, user interface 225 is provided by image exploration apparatus 200 via the user device 105. According to some aspects, user interface 225 is implemented via a web browser or other software application included in the user device and/or image exploration apparatus 200. According to some aspects, user interface 225 interacts with components of image exploration apparatus 200 and/or a database as described with refence to FIG. 1 via API calls.

FIG. 3 shows an example of data flow in an image exploration apparatus according to aspects of the present disclosure. The example shown includes set of images 300, reduction component 305, representative set of images 310, sorting component 315, grid structure arrangement 320, user interface 325, and display of representative set of images 330. Reduction component 305 is an example of, or includes aspects of, the corresponding element described with reference to FIG. 2. Sorting component 315 is an example of, or includes aspects of, the corresponding element described with reference to FIG. 2. User interface 325 is an example of, or includes aspects of, the corresponding element described with reference to FIG. 2.

Referring to FIG. 3, according to some aspects, reduction component 305 receives set of images 300 (for example, from a database as described with reference to FIG. 1) and reduces set of images 300 to obtain representative set of images 310. In some embodiments, reduction component 305 reduces set of images 300 to obtain representative set of images 310 as described with reference to FIG. 5.

According to some aspects, sorting component receives representative set of images 310 (for example, from reduction component 305 or from the database) and generates grid structure arrangement 320 of representative set of images 310. In some embodiments, sorting component 315 generates grid structure arrangement 320 of representative set of images 310 as described with reference to FIG. 5.

According to some aspects, user interface 325 receives representative set of images 310 and grid structure arrangement 320 (for example, from reduction component 305, sorting component 315, the database, or a combination thereof) and provides a display of representative set of images 330 based on grid structure arrangement 320. In some embodiments, user interface provides the display of representative set of images 330 as described with reference to FIGS. 5-10.

Image Exploration

A method for exploration of large-scale image sets is described with reference to FIGS. 4-11. One or more aspects of the method include identifying a set of images; reducing the set of images to obtain a representative set of images that is distributed throughout the set of images by removing a neighbor image based on a proximity of the neighbor image to an image of the representative set of images; arranging the representative set of images in a grid structure using a self-sorting map (SSM) algorithm; and displaying a portion of the representative set of images based on the grid structure. In some aspects, the proximity is determined according to a self-organizing map algorithm. In some aspects, the representative set of images is evenly distributed across the set of images.

Some examples of the method further include receiving a navigation input corresponding to an image of the representative set of images. Some examples further include identifying a set of neighbor images of the image from among the set of images, wherein at least one image in the set of neighbor images is not included in the representative set of images. Some examples further include arranging the set of neighbor images in a second grid structure based on the navigation input. Some examples further include displaying the set of neighbor images based on the second grid structure.

Some examples of the method further include embedding the set of images to obtain an embedded set of images. Some examples further include adding the embedded set of images to a nearest neighbor index. Some examples further include identifying the set of neighbor images based on the nearest neighbor index.

Some examples of the method further include identifying a plurality of subsets of the representative set of images. Some examples further include selecting a representative image from each of the plurality of subsets of the representative set of images.

Some examples of the method further include identifying a centroid for each of the plurality of subsets of the representative set of images. Some examples further include selecting the representative image based on the centroid. Some examples of the method further include including the representative image from each of the plurality of subsets of the representative set of images in a second grid structure. Some examples further include receiving a navigation input. Some examples further include displaying the representative images based on the second grid structure in response to the navigation input.

Some examples of the method further include generating a graph of the set of images. Some examples further include removing the neighbor image based on the graph. Some examples of the method further include generating an image embedding for each of the set of images, wherein the graph is based on the embedding. Some examples of the method further include computing a length of an edge of the graph between the image and the neighbor image, wherein the proximity is based on the length of the edge. Some examples of the method further include computing the proximity of the image to the neighbor image using a nearest neighbor algorithm.

Some examples of the method further include identifying a first edge of the grid structure and a second edge of the grid structure opposite to the first edge in a first direction. Some examples further include connecting the first edge and the second edge to enable continuous navigation around the grid structure in the first direction. Some examples of the method further include identifying a third edge of the grid structure and a fourth edge of the grid structure opposite to the third edge in a second direction. Some examples further include connecting the third edge and the fourth edge to enable continuous navigation around the grid structure in the second direction.

Some examples of the method further include determining a location identifier, wherein the portion of the representative set of images is displayed based on the location identifier. Some examples of the method further include assigning a bookmark to the location identifier at a first time. Some examples further include displaying the portion of the representative set of images at a second time after the first time based on the bookmark. Some examples of the method further include generating a minimap for the representative set of images. Some examples further include displaying a navigation position of the location identifier in the minimap.

A method for exploration of large-scale image sets is described with reference to FIGS. 4-11. One or more aspects of the method include identifying a set of images; reducing the set of images to obtain a representative set of images; arranging the representative set of images in a grid structure using a self-sorting map (SSM) algorithm; displaying a portion of the representative set of images based on the grid structure; receiving a navigation input corresponding to an image of the representative set of images; identifying a set of neighbor images of the image from among the set of images, wherein at least one image in the set of neighbor images is not included in the representative set of images; arranging the set of neighbor images in a second grid structure based on the navigation input; and displaying the set of neighbor images based on the second grid structure.

Some examples of the method further include removing a neighbor image based on a proximity of the neighbor image to an image of the representative set of images, wherein the representative set of images is distributed throughout the set of images.

Figure 4:
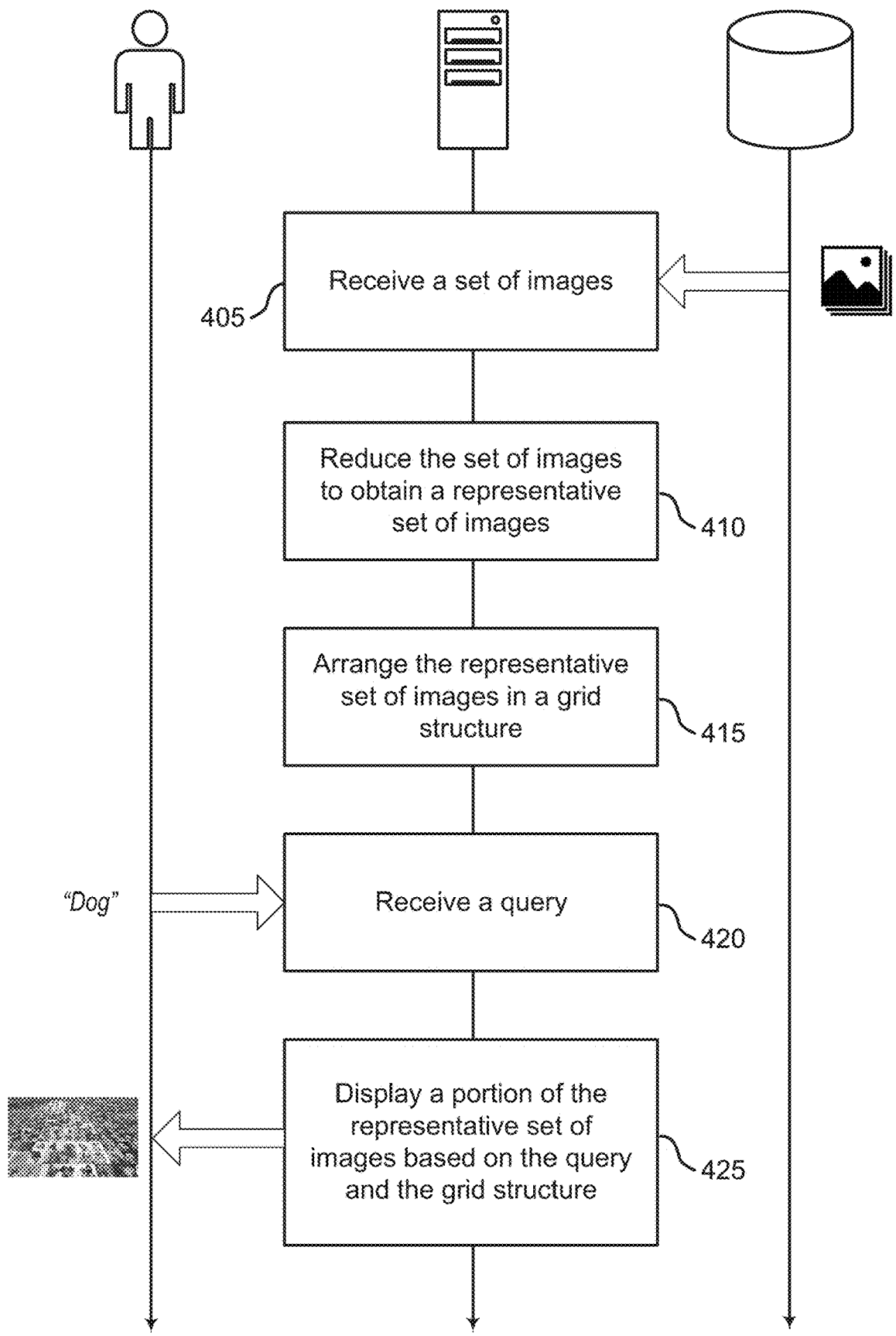
FIG. 4 shows an example of image exploration according to aspects of the present disclosure.

FIG. 4 shows an example of image exploration according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, according to some aspects, the system displays a portion of a representative set of images based on a grid structure in response to a user query. In some embodiments, the system obtains the representative set of images by reducing an original set of images. For example, in some embodiments, the original set of images is too large to effectively display according to a grid structure. Accordingly, by reducing the set of images to the representative set of images, and displaying the representative images in a grid structure such that similar images are disposed in proximity to each other, and a similarity between a pair of images decreases as a distance between them increases, the system enables a user to search for an image or images included in the set of images and to view the image and images that are representative of the original set of images in a manner that would not be computationally practical if all of the set images were to be displayed.

At operation 405, the system receives a set of images. In some cases, the operations of this step refer to, or may be performed by, an image exploration apparatus as described with reference to FIGS. 1 and 2. For example, in some embodiments, the image exploration apparatus retrieves the set of images from a database as described with reference to FIG. 1, or from another data source, such as the Internet.

At operation 410, the system reduces the set of images to obtain a representative set of images. In some cases, the operations of this step refer to, or may be performed by, an image exploration apparatus as described with reference to FIGS. 1 and 2. According to some aspects, the image exploration apparatus reduces the set of images by removing neighbor images to obtain the representative set of images as described with reference to FIG. 5.

At operation 415, the system arranges the representative set of images in a grid structure. In some cases, the operations of this step refer to, or may be performed by, an image exploration apparatus as described with reference to FIGS.

1 and 2. In some embodiments, the image exploration apparatus arranges the reduced set of images in a grid structure as described with reference to FIGS. 5-6.

At operation 420, the system receives a search query. In some cases, the operations of this step refer to, or may be performed by, an image exploration apparatus as described with reference to FIGS. 1 and 2. In some embodiments, the image exploration apparatus receives the query via a user interface as described with reference to FIGS. 1 and 2. In some embodiments, the query includes text, an image, or a combination thereof.

At operation 425, the system displays a portion of the representative set of images corresponding to the query based on the grid structure. In some cases, the operations of this step refer to, or may be performed by, an image exploration apparatus as described with reference to FIGS. 1 and 2. In some embodiments, the image exploration apparatus determines a similarity between the query and an image of the representative set of images, and displays the portion of the representative set of images including the identified image in response to the identification. In some embodiments, the image exploration apparatus determines an embedding of the query and determines a match between the query embedding and an embedding or annotation of the identified image, where the image is identified based on the match. According to some aspects, the image exploration apparatus displays the representative set of images as described with reference to FIGS. 5-10.

Figure 5:
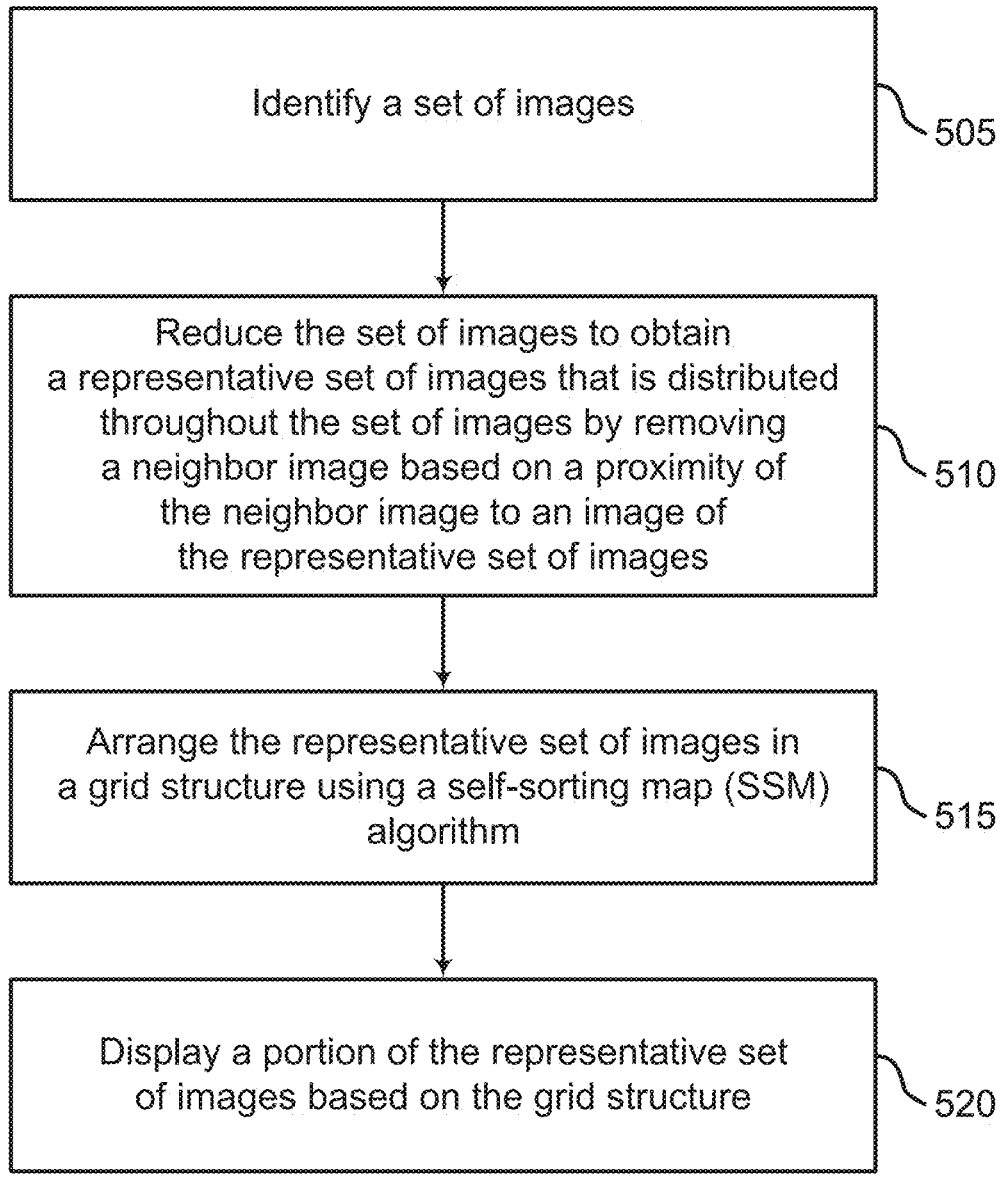
FIG. 5 shows an example of displaying images based on a grid structure according to aspects of the present disclosure.

FIG. 5 shows an example of displaying images based on a grid structure according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, according to some aspects, the system reduces a set of images to a representative set of images that is distributed across the set of images, and displays a portion of the representative set of images based on a grid structure that is determined using a self-sorting map algorithm. By reducing the set of images to the representative set of images and displaying the representative set of images based on the grid structure, the system enables a user to quickly find an image, see images that are similar to the image, and navigate to other images that represent the set of images without arranging all of the set of images in a grid structure, which is time-consuming, computationally expensive, and impractical if the set of images is sufficiently large.

At operation 505, the system identifies a set of images. In some cases, the operations of this step refer to, or may be performed by, a reduction component as described with reference to FIGS. 2 and 3. In some embodiments, the reduction component identifies the set of images in response to a user command received from the user by the reduction component via a user interface described with reference to FIGS. 1 and/or 2. In some embodiments, the reduction component is configured to automatically identify the set of images. In some embodiments, the reduction component retrieves the set of images from a database described with reference to FIG. 1 in response to the identification, or retrieves the set of images from another data repository, such as the Internet, in response to the identification. According to some aspects, the set of images is a large set of images. For example, in some embodiments, the set of images includes on the order of ten million images.

At operation 510, the system reduces the set of images to obtain a representative set of images that is distributed throughout the set of images by removing a neighbor image based on a proximity of the neighbor image to an image of the representative set of images. In some cases, the operations of this step refer to, or may be performed by, a reduction component as described with reference to FIGS. 2 and 3. For example, in some embodiments, the reduction component generates a graph of the images and removes the neighbor image based on the graph.

According to some aspects, the reduction component generates an image embedding for each of the set of images. For example, in some embodiments, after the reduction component identifies the set of images, the reduction component computes an embedding including a weight vector for reach of the set of images.

According to some aspects, the reduction component includes a self-organizing map (SOM) algorithm that sorts the set of images into a two-dimensional graph. In some embodiments, the SOM algorithm sorts the set of images into the two-dimensional torus-shaped graph based on the image embeddings for the set of images, where each image embedding corresponds to a node of the graph. According to some aspects, the SOM algorithm is implemented by an ANN included in the reduction component. According to some aspects, the ANN is trained according to an unsupervised learning schema. Unsupervised learning is one of three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

According to some aspects, the SOM algorithm initializes the nodes of the graph with small random values. According to some aspects, the reduction component provides the image embeddings for the graph to the SOM. According to some aspects, the SOM algorithm receives an image embedding, computes a similarity between the weight vector of the image embedding and the values of the nodes in the graph, and assigns the image corresponding to the image embedding to a node of the graph having a value that is most similar to the weight value corresponding to the image. According to some aspects, the SOM algorithm adjusts the values of the non-assigned nodes toward the weight value corresponding to the image. According to some aspects, the SOM algorithm iteratively repeats this process until each of the set of images is assigned to a node of the graph.

According to some aspects, the reduction component identifies a set of images for the representative set of images by identifying a set of nodes corresponding to the set of images that are distributed throughout the graph. In some embodiments, the reduction component identifies a set of nodes that are evenly spaced apart from each other by a predetermined distance. According to some aspects, the nodes of the graph are connected by edges. In some embodiments, a distance between a pair of nodes is determined based on a length of the edge connecting the pair of nodes. According to some aspects, the distance between the pair of nodes (e.g., a proximity between the nodes) corresponds to a length of the edge, and the length of the edge is determined by the SOM algorithm using a nearest neighbor algorithm.

For example, in some embodiments, the SOM algorithm uses a nearest neighbor algorithm to determine a difference in weight values between the pair of nodes, and the length of the edge that connects the pair of nodes corresponds to the difference between the weight values.

According to some aspects, the reduction component reduces the set of images to obtain a representative set of images that is distributed throughout the set of images by removing a neighbor image based on a proximity of the neighbor image to an image of the representative set of images. In an example, after the reduction component identifies the set of images for the representative images, the reduction component removes nodes of the graph corresponding to neighbor images of the set of images, where a neighbor image is an image that is a predetermined distance from an image of the representative set of images, to obtain a reduced graph including nodes corresponding to the reduced set of images. For example, in some embodiments, the reduction component computes a length of an edge of the graph between an image and a neighbor image, where the proximity is based on the length of the edge. According to some aspects, the reduction component identifies the representative set of images and the relative positions of the representative set of images corresponding to the positions of the nodes of the reduced graph. According to some aspects, the reduction component stores the representative set of images and the relative positions of the representative set of images in the database described with reference to FIG. 1.

According to some aspects, the reduction component constructs a nearest neighbor graph including nodes corresponding to each of the set of images, identifies nodes of the nearest neighbor graph for a representative set of images by identifying redundant neighbor nodes of the nearest neighbor graph, and removing images corresponding to the nearest nodes from the set of images to obtain the representative set of images. According to some aspects, the reduction component identifies the redundant neighbor nodes based on a degree of the redundant nearest neighbor nodes.

According to some aspects, the reduction component obtains the representative set of images by obtaining a set of clusters for the set of images, selecting a representative image from each of the clusters, and adding each of the representative images to the representative set of images.

According to some aspects, the representative set of images is evenly distributed across the set of images. For example, in some embodiments, the reduction component randomly selects the representative set of images from a whole space corresponding to the set of images. In another example, in some embodiments, the reduction component selects the representative set of images from each of a set of regions covering a space corresponding to the set of images. In another example, in some embodiments, the reduction component selects the representative set of images from a combination of each of a set of regions covering a space corresponding to the set of images. In another example, in some embodiments, the reduction component selects the representative set of images to optimize a spacing metric. In another example, in some embodiments, the representative set of images correspond to a set of nodes of a graph (such as the two-dimensional graph organized by the SOM algorithm or the nearest neighbor graph) that are equally spaced apart from each other.

According to some aspects, the representative set of images is a coreset of the set of images. A coreset is a small set of points that approximates the shape of a larger point set, such that applying a geometric heuristic (for example, a minimum bounding box volume) to the coreset and the larger point set results in approximately equal numbers. Accordingly, a model fitting the coreset will also provide a good fit for the larger point set. Therefore, according to some aspects, the representative set of images is distributed throughout the set of images such that the representative set of images is a coreset of the set of images.

By removing neighbor images of a representative set of images that is distributed throughout the set of images, the reduction component obtains a reduced set of images that accurately and representatively samples the set of images. In contrast, conventional image exploration techniques use a SOM algorithm to reduce a graph of images but do not provide a mechanism for ensuing that the reduced set of images is a representative sample of the original set of images.

At operation 515, the system arranges the representative set of images in a grid structure using a self-sorting map (SSM) algorithm. In some cases, the operations of this step refer to, or may be performed by, a sorting component as described with reference to FIGS. 2 and 3.

According to some aspects, the sorting component receives the representative set of images, the reduced graph corresponding to the representative of images, the relative positions of the representative set of images, or a combination thereof from the reduction component and/or the database in response to the reduction component obtaining the representative set of images as described in operation 510.

Figure 6:
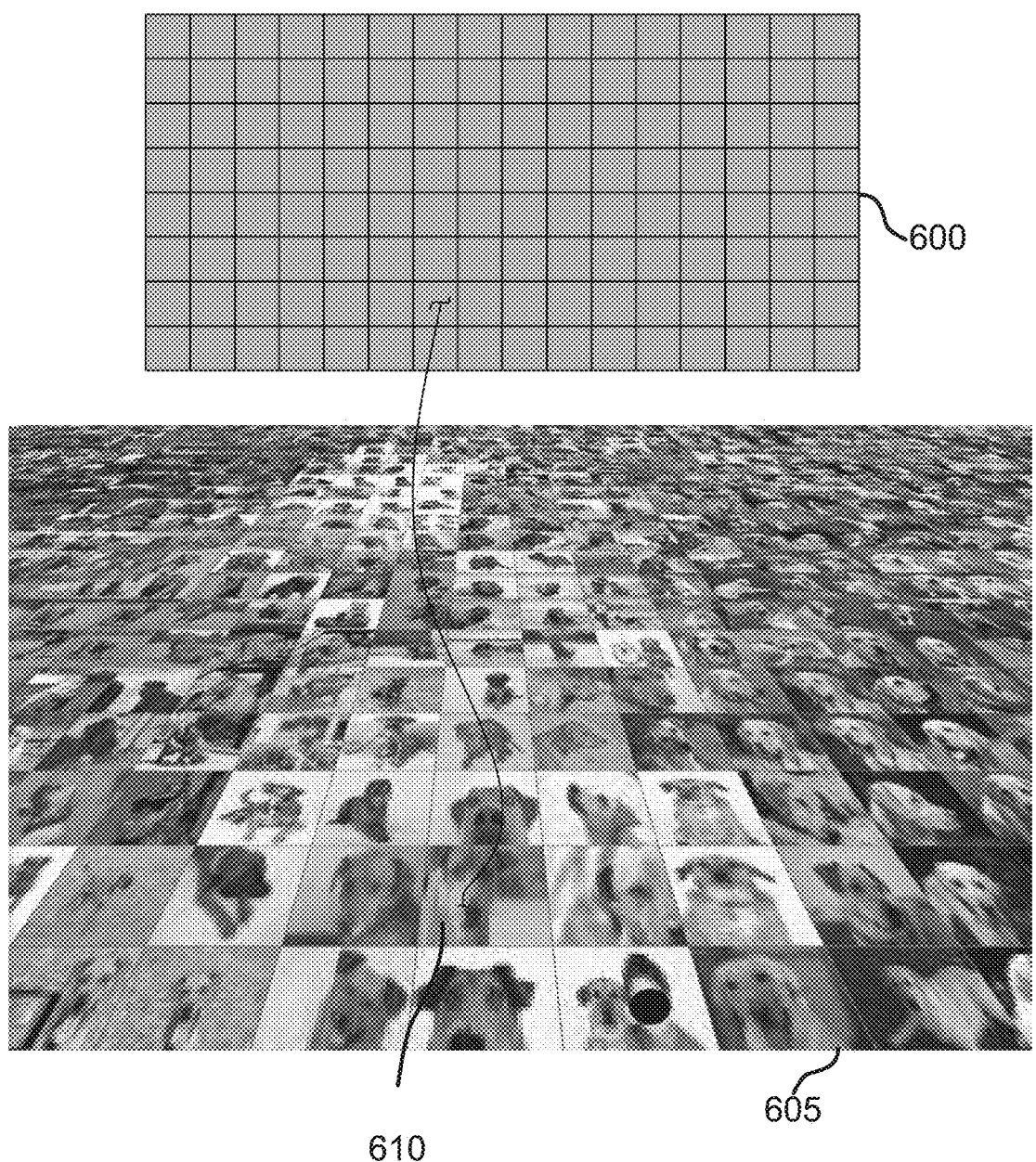
FIG. 6 shows an example of a grid structure according to aspects of the present disclosure.

According to some aspects, the sorting component uses the SSM algorithm to arrange the representative set of images into cells corresponding to relative positions of the representative images. In some embodiments, the SSM algorithm identifies a block including four cells arranged in a first direction and four cells arranged in a second direction orthogonal to the first direction and computes a mean of the embeddings of the representative images corresponding to the block. In some embodiments, the SSM algorithm identifies an arrangement of the cells that minimizes a sum of squared differences between the embeddings of the representative images corresponding to the block and the mean of the embeddings. In some embodiments, the SSM algorithm reduces the size of the block by half until the block size is one. According to some aspects, the SSM algorithm iteratively repeats this process until the representative set of images is arranged in a grid structure including a set of blocks of size one. An example grid structure and example portion of the representative set of images is illustrated in FIG. 6.

According to some aspects, the sorting component identifies a first edge of the grid structure and a second edge of the grid structure opposite to the first edge in a first direction, and connects the first edge and the second edge to enable continuous navigation around the grid structure in the first direction. According to some aspects, the sorting component identifies a third edge of the grid structure and a fourth edge of the grid structure opposite to the third edge in a second direction, and connects the third edge and the fourth edge to enable continuous navigation around the grid structure in the second direction. In contrast to the edges of the graph described with reference to operation 514, the edges of the grid structure refer to portions of a boundary of the grid structure. For example, in some embodiments, by connecting the first edge to the second edge and the third edge to the fourth edge, the sorting component provides a two-dimensional torus-shaped grid structure that enables continuous navigation through the grid structure that is not interrupted by a boundary of the grid structure.

According to some aspects, the sorting component stores the representative set of images in the database, the grid structure, or a combination thereof in the database.

At operation 520, the system displays a portion of the representative set of images based on the grid structure. In some cases, the operations of this step refer to, or may be performed by, a user interface as described with reference to FIG. 2.

According to some aspects, the user interface retrieves the representative set of images, the grid structure, or the combination thereof from the sorting component, the database, or a combination thereof. According to some aspects, the portion of the representative set of images are displayed based on the relative positions of the representative set of images corresponding to the grid structure. According to some aspects, the user interface selects a random image of the representative set of images and displays the image and a predetermined number of proximate images of the representative set of images.

According to some aspects, the user interface displays the portion of the representative set of images in response to a user input. In some embodiments, the user input is a query. In some embodiments, the user interface identifies an image of the representative set of images that corresponds to the query and displays the image and a predetermined number of proximate images of the representative set of images in response to the query. In some embodiments, the query corresponds to the image based on metadata embedded in the image or stored in the database and associated with the image via a data schema stored in the database. In some embodiments, the query corresponds to the image based on an embedding of the query. In this case, the query component provides the query to the reduction component, the reduction component produces an embedding of the query, identifies an image embedding that is similar to the embedding of the query, and identifies the image corresponding to the identified image embedding to the user interface, and the user interface displays the image and a predetermined number of proximate images of the representative set of images.

According to some aspects, the user interface displays a different portion of the representative set of images in response to a user input, such as a panning input. Examples of a panning input include a user selection of a directional button displayed by the user interface, or by a user input of clicking and holding a point on the display of the portion of the representative set of images and subsequently dragging the display. An example grid structure and example portion of the representative set of images is illustrated in FIG. 6.

According to some aspects, the grid structure is a two-dimensional torus-shaped grid, where the portion of the representative set of images are displayed as a two-dimensional grid. Accordingly, the user may continue providing a panning input to the user interface to display the different portion of the representative set of images without encountering a boundary of the grid structure.

According to some aspects, the user interface determines a location identifier, where the portion of the representative set of images is displayed based on the identifier. For example, in some embodiments, the user interface assigns a location identifier based on the image of the representative set of images that is randomly selected or identified in response to the user input. In some embodiments, the location identifier is a location of the image in the grid structure. In some embodiments, the location identifier is an x, y coordinate of the location of the image in the grid structure, where "x" is an index in a row of the grid in a first direction and "y" is an index in a column of the grid in a second direction orthogonal to the first direction.

Figure 10:
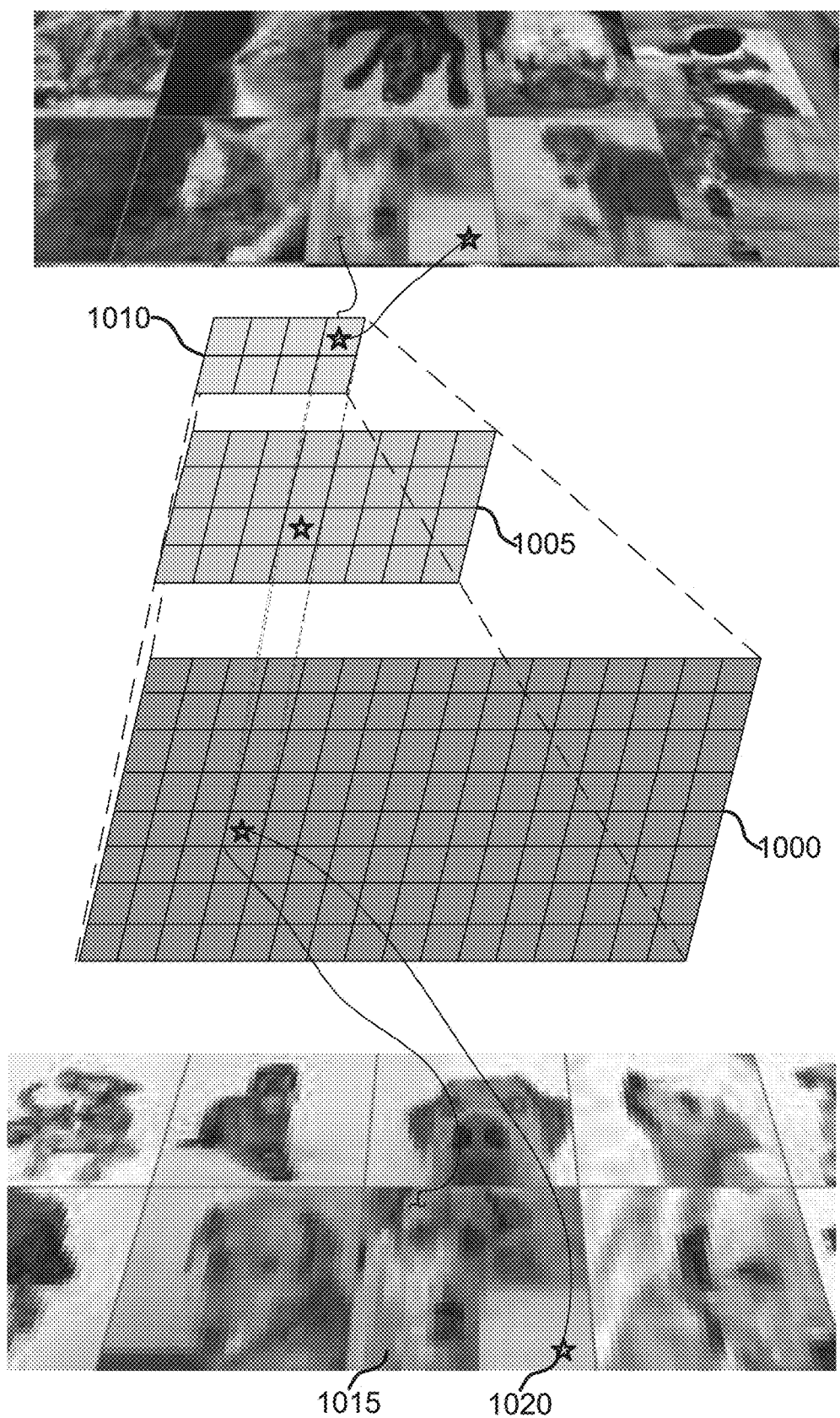
FIG. 10 shows an example of bookmarking an image according to aspects of the present disclosure.

According to some aspects, the user interface assigns a bookmark to the location identifier at a first time and displays the portion of the representative set of images at a second time after the first time based on the bookmark. For example, in some embodiments, after the sorting component identifies the image to be displayed to the user interface, the user interface assigns a location identifier to the image, assigns a bookmark to the location identifier corresponding to the image, and displays the portion of the representative set of images that correspond to grid coordinates that are proximate to the location identifier. According to some aspects, a user provides a bookmark input to a position of a user interface corresponding to an image, and the user interface assigns a bookmark to the image based on a location identifier associated with the image. An image and bookmark are illustrated by FIG. 10.

According to some aspects, the reduction component retrieves the representative set of images, the grid structure, or the combination thereof from the sorting component, the database, or a combination thereof. According to some aspects, the reduction component identifies a set of subsets of the representative set of images and selects a representative image from each of the set of subsets of the representative set of images. According to some aspects, each of the subsets includes four images in a 2×2 arrangement in two crossing directions.

For example, according to some embodiments, the reduction component identifies a centroid for each of the set of subsets of the representative set of images and selects the representative image based on the centroid. In some embodiments, the reduction component selects an image having an embedding that is nearest to the centroid as the representative image. In another example, according to some aspects, the reduction component randomly selects the representative image for each of the set of subsets of the representative set of images. In another example, according to some aspects, the reduction component selects a representative image for each of the set of subsets of the representative set of images that corresponds to a predetermined relative position in the set of subsets (such as a top-left position, a top right position, etc.).

According to some aspects, the reduction component identifies a set of subsets of the representative images and selects a representative image from each of the set of subsets of the representative images. According to some aspects, each of the subsets includes four images in a 2×2 arrangement in two crossing directions.

According to some aspects, the reduction component stores the representative images for the set of subsets of the representative set of images, the representative images of for the set of subsets of the representative images, or a combination thereof in the database. According to some aspects, the user interface receives the representative images for the set of subsets of the representative set of images, the representative images of for the set of subsets of the representative images, or the combination thereof from the reduction component, the database, or a combination thereof.

According to some aspects, the user interface includes the representative image for each of the set of subsets of the representative set of images in a second grid structure. According to some aspects, the user interface includes the representative image for each of the set of subsets of the representative images in a third grid structure. According to some aspects, the user interface receives a navigation input. Examples of a navigation input include clicking on a portion of the user interface corresponding to an image and then clicking on a navigation button displayed by the user interface, or hovering a cursor over the portion of the user interface corresponding to the image and then scrolling a scroll wheel of a mouse.

According to some aspects, the user interface displays the representative images based on the second grid structure in response to the navigation input. In an example, the user interface displays the representative set of images corresponding to the grid structure (e.g., a first grid structure) described with reference to FIGS. 5 and 6, receives the navigation input, and displays the representative images in positions determined by the second grid structure in response to the navigation input.

According to some aspects, the user interface displays the representative images based on the third grid structure in response to the navigation input. In an example, the user interface displays the representative images corresponding to the second grid structure, receives the navigation input, and displays the representative images in positions determined by the third grid structure in response to the navigation input. Multiple grid structures are described with reference to FIG. 7.

According to some aspects, the user interface generates a minimap for the representative set of images and displays a navigation position of the location identifier in the minimap. In some embodiments, the minimap includes a representation of the representative set of images, a representation of the representative images for the representative set of images, a representation of navigation positions in terms of a user's position (determined, for example, by a cursor position) in the user interface, a representation of a grid structure described with reference to FIG. 6 or multiple grid structures described with reference to FIGS. 7 and 10, or a combination thereof. According to some aspects, the minimap includes a representation of a location identifier corresponding to an image. According to some aspects, the minimap includes a representation of a bookmark corresponding to an image. According to some aspects, the minimap can highlight portions of the minimap that correspond to images that match a user query (as determined, for example, by a probability of a match exceeding a predetermined threshold probability).

According to some aspects, the system arranges and displays a set of neighbor images based on a navigation input as described with reference to FIG. 11.

FIG. 6 shows an example of a grid structure according to aspects of the present disclosure. The example shown includes grid structure 600, portion of representative set of images 605, and image 610. Grid structure 600 is an example of, or includes aspects of, the corresponding first grid structure described with reference to FIGS. 8 and 10. Image 610 is an example of, or includes aspects of, the corresponding element described with reference to FIGS. 9, 10, and 11.

Referring to FIG. 6, the user interface described with reference to FIG. 2 displays portion of representative set of images 605 including image 610. In some embodiments, the arrangement of portion of representative set of images 605 corresponds to grid structure 600. In some embodiments, image 610 is randomly selected for display by the user interface. In some embodiments, image 610 is selected for display by user interface in response to a user input, such as a query. In some embodiments, portion of representative set of images 605 is displayed based on proximity to image 610. In some embodiments, user interface may receive a user input such as a panning input to display a different portion of the representative images, as described with reference to FIG. 5. In some embodiments, a user may provide an "enlarge" input to the user interface corresponding to an image of portion of representative set of images 605 (such as clicking on the portion of the user interface corresponding to the image), and the user interface displays an enlarged image of the image in response to the "enlarge" input.

Figure 7:
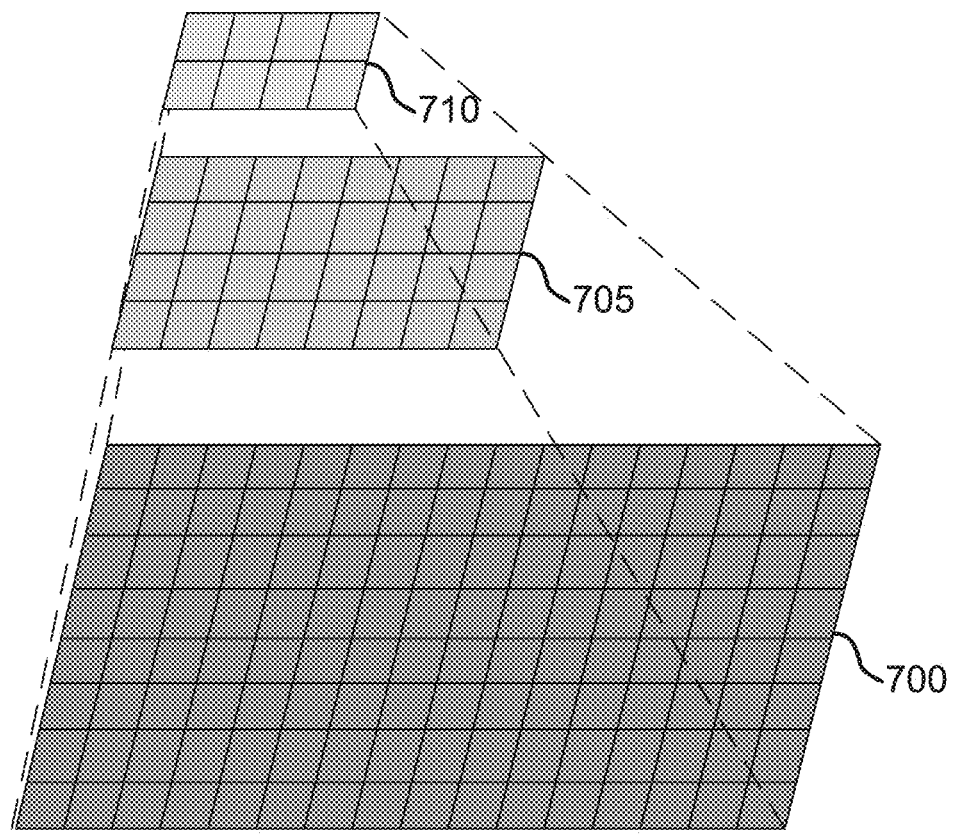
FIG. 7 shows an example of multiple grid structures according to aspects of the present disclosure.
Figure 8:
FIG. 8 shows an example of first representative images according to aspects of the present disclosure.
Figure 9:
FIG. 9 shows an example of second representative images according to aspects of the present disclosure.

FIG. 7 shows an example of multiple grid structures according to aspects of the present disclosure. The example shown includes first grid structure 700, second grid structure 705, and third grid structure 710. First grid structure 700 is an example of, or includes aspects of, the corresponding element described with reference to FIGS. 6 and 10. Second grid structure 705 is an example of, or includes aspects of, the corresponding element described with reference to FIG. 10. Third grid structure 710 is an example of, or includes aspects of, the corresponding element described with reference to FIG. 10.

Referring to FIG. 7, according to some aspects, the user interface displays a portion of a representative set of images based on first grid structure 700 (e.g., the grid structure described with reference to FIG. 6). According to some aspects, the user interface receives a navigation input (such as, for example, an input to a portion of the user interface corresponding to an image and a subsequent input to a navigation button displayed by the user interface, or a scroll-wheel or pinch input while an image is under a cursor or fingers) and displays representative images from each of a set of subsets of the representative images based on second grid structure 705 in response to the navigation input.

According to some aspects, second grid structure 705 corresponds to a "zoomed-out" representation of first grid structure 700, according to which a smaller number of images depicting a more diverse set of subjects is displayed. For example, referring to FIG. 6, representative set of images 605 corresponding to first grid structure 700 includes images that are similar to image 610, which depicts a dog, while representative images 800 of FIG. 8 corresponding to second grid structure 705 depicts a greater number of images that are dissimilar to image 805 (e.g., images that depict different kinds of dogs than the dog depicted in image 805, or images that do not depict a dog). As similar images are grouped together, this increase in the diversity of images allows a user to more quickly navigate the representative set of images than if the user panned through the entirety of the representative set of images.

Furthermore, in some embodiments, the system can generate and depict additional grid structures to display additional representative images. For example, in some embodiments, the system determines third grid structure 710 as described with reference to FIG. 5, and the user interface includes representative images such as second representative images 900 illustrated by FIG. 9 in third grid structure 710. By determining successive grid structures and displaying successive representative images according to the successive grid structures, the system allows a user to further "zoom out" the set of images by reducing the set of images, enabling the user to quickly see and navigate to clusters of images that are dissimilar to an initial image (such as image 905 illustrated by FIG. 9), and to "zoom in" via a navigation input to a cluster of images that are similar to a selected image. For example, comparing FIGS. 6, 8, and 9, images 610, 805, and 905 are the same, while the diversity of neighbor images to images 610, 805, and 905 respectively increases from FIG. 6 to FIG. 8 to FIG. 9.

FIG. 10 shows an example of bookmarking an image according to aspects of the present disclosure. The example shown includes first grid structure 1000, second grid structure 1005, third grid structure 1010, image 1015, and bookmark 1020. First grid structure 1000 is an example of, or includes aspects of, the corresponding element described with reference to FIGS. 6 and 7. Second grid structure 1005 is an example of, or includes aspects of, the corresponding element described with reference to FIG. 7. Third grid structure 1010 is an example of, or includes aspects of, the corresponding element described with reference to FIG. 7. Image 1015 is an example of, or includes aspects of, the corresponding element described with reference to FIGS. 6, 8, and 9.

Referring to FIG. 10, the user interface may assign bookmark 1020 to one or more images (such as image 1015) displayed by the user interface in response to a "bookmark" input received from a user. According to some aspects, bookmark 1020 allows a user to quickly return to the location of a location identifier corresponding to bookmark 1020. For example, a user may provide a panning input so that image 1015 corresponding to bookmark 1020 is no longer displayed by the user interface. In some embodiments, the user interface includes a "return to bookmark" button that when interacted with displays image 1015 and neighbor images of image 1015 based on a current grid structure. According to some aspects, bookmark 1020 retains its association with image 1015 as a user navigates multiple grid structures, such as first grid structure 1000, second grid structure 1005, third grid structure 1010. In some embodiments, bookmark 1020 is depicted as an icon (such as a star) overlaid on an image. In some embodiments, the icon associated with bookmark 1020 is included in the minimap representation described with reference to FIG. 5.

Figure 11:
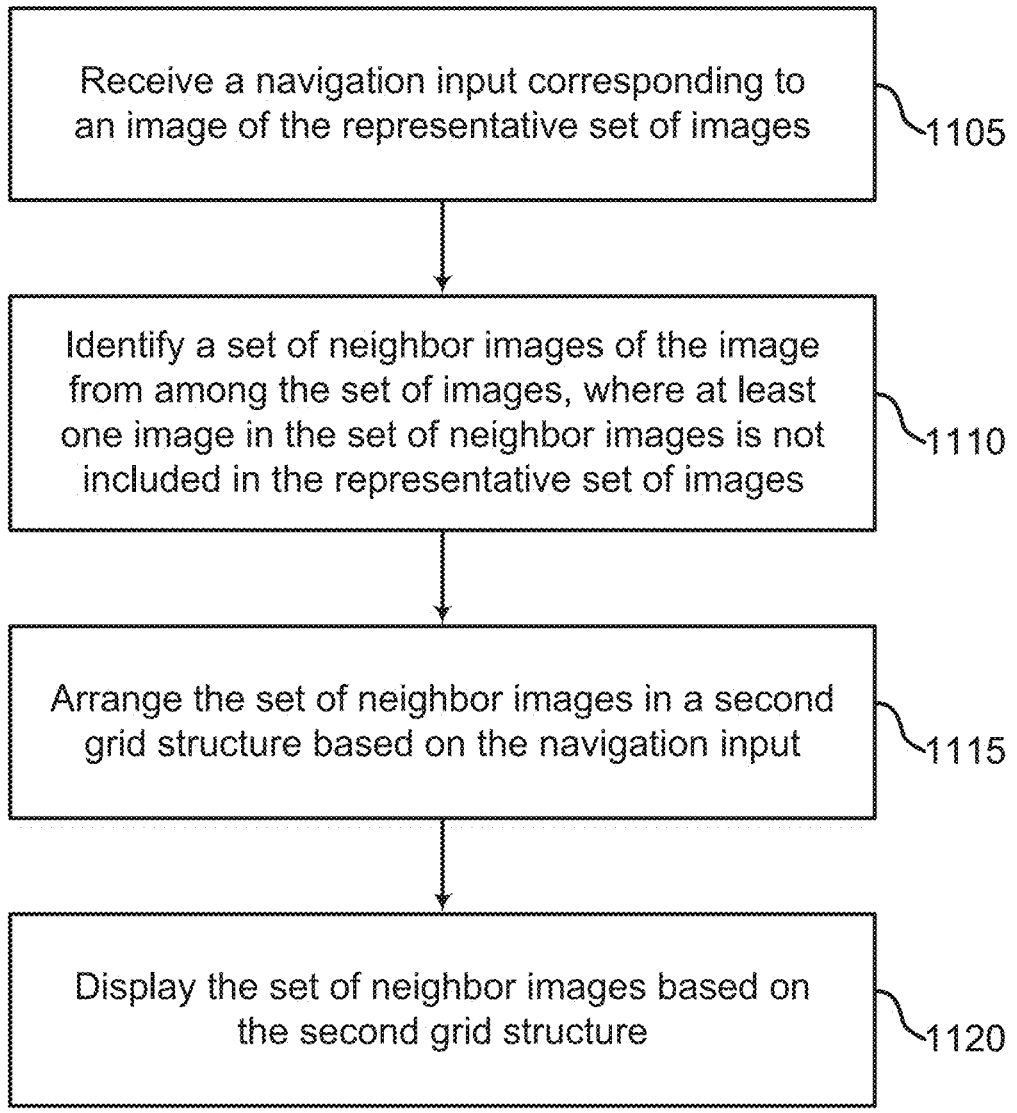
FIG. 11 shows an example of displaying a set of neighbor images according to aspects of the present disclosure.

FIG. 11 shows an example of displaying a set of neighbor images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, the system determines and displays a set of neighbor images and a second grid structure in response to receiving a navigation input. According to some aspects, the set of neighbor images and second grid structure allow a user to review the set of images at a finer level of detail than is provided by the representative set of images described with reference to FIGS. 5 and 6. For example, in some embodiments, a user may initially search for an image in the representative set of images, and may desire to see additional similar images that may be included in the set of images but are not included in the representative set of images. By dynamically retrieving a set of neighbor images corresponding to the image in response to a navigation input and displaying the set of neighbor images according to a second grid structure, the system allows a user to quickly discover similar images without creating a grid structure of every image in the set of images, which would be inefficient and computationally impractical.

At operation 1105, the system receives a navigation input corresponding to an image of the representative set of images. In some cases, the operations of this step refer to, or may be performed by, a user interface as described with reference to FIG. 2. Examples of a navigation input include clicking on a portion of the user interface corresponding to an image and then clicking on a navigation button displayed by the user interface, or hovering a cursor over the portion of the user interface corresponding to the image and then scrolling a scroll wheel of a mouse. According to some aspects, the navigation input is received when the user interface is displaying the set of representative images displayed according to a grid structure as described with reference to FIGS. 5 and 6.

At operation 1110, the system identifies a set of neighbor images of the image from among the set of images, where at least one image in the set of neighbor images is not included in the representative set of images. In some cases, the operations of this step refer to, or may be performed by, a reduction component as described with reference to FIGS. 2 and 3.

For example, in some embodiments, the reduction component embeds the set of images to obtain an embedded set of images, adds the embedded set of images to a nearest neighbor index, and identifies the set of neighbor images based on the nearest neighbor index. According to some aspects, the reduction component identifies a predetermined number of nearest neighbor images to the image (for example, based on a similarity of the embedded set of images and the embedding of the image described with reference to FIG. 5) in response to receiving the navigation input.

According to some aspects, the system includes an image generation component that generates the set of nearest neighbor images in response to the navigation input. According to some aspects, the image generation component is a generative adversarial network (GAN). A GAN is a category of ANN in which two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real). According to some aspects, the image generation component generates a predetermined number of nearest neighbor images based on the image.

At operation 1115, the system arranges the set of neighbor images in a second grid structure based on the navigation input. In some cases, the operations of this step refer to, or may be performed by, a sorting component as described with reference to FIGS. 2 and 3. For example, in some embodiments, the sorting component receives the set of neighbor images from the reduction component and/or the database described with reference to FIG. 1 and uses a self-sorting map (SSM) algorithm as described with reference to FIG. 5 to arrange the images in the second grid structure in response to receiving the navigation input.

At operation 1120, the system displays the set of neighbor images based on the second grid structure. In some cases, the operations of this step refer to, or may be performed by, a user interface as described with reference to FIG. 2. For example, in some embodiments, the user interface receives the set of neighbor images and the second grid structure from the sorting component and/or the database and displays the set of neighbor images according to positions corresponding to the set of neighbor image's placement in the second grid structure.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image exploration, comprising:
identifying a set of images;
reducing the set of images to obtain a representative set of images that is distributed throughout the set of images by removing a neighbor image based on a proximity of the neighbor image to an image of the representative set of images;
arranging the representative set of images in a grid structure using a self-sorting map (SSM) algorithm; and
displaying a portion of the representative set of images based on the grid structure.

2. The method of claim 1, further comprising:
receiving a navigation input corresponding to an image of the representative set of images;
identifying a set of neighbor images of the image from among the set of images, wherein at least one image in the set of neighbor images is not included in the representative set of images;
arranging the set of neighbor images in a second grid structure based on the navigation input; and
displaying the set of neighbor images based on the second grid structure.

3. The method of claim 2, further comprising:
embedding the set of images to obtain an embedded set of images;
adding the embedded set of images to a nearest neighbor index; and
identifying the set of neighbor images based on the nearest neighbor index.

4. The method of claim 1, further comprising:
identifying a plurality of subsets of the representative set of images; and
selecting a representative image from each of the plurality of subsets of the representative set of images.

5. The method of claim 4, further comprising:
identifying a centroid for each of the plurality of subsets of the representative set of images; and
selecting the representative image based on the centroid.

6. The method of claim 4, further comprising:
including the representative image from each of the plurality of subsets of the representative set of images in a second grid structure;
receiving a navigation input; and
displaying the representative images based on the second grid structure in response to the navigation input.

7. The method of claim 1, further comprising:
generating a graph of the set of images; and
removing the neighbor image based on the graph.

8. The method of claim 7, further comprising:
generating an image embedding for each of the set of images, wherein the graph is based on the embedding.

9. The method of claim 7, further comprising:
computing a length of an edge of the graph between the image and the neighbor image, wherein the proximity is based on the length of the edge.

10. The method of claim 1, wherein:
the proximity is determined according to a self-organizing map algorithm.

11. The method of claim 1, further comprising:
computing the proximity of the image to the neighbor image using a nearest neighbor algorithm.

12. The method of claim 1, wherein:
the representative set of images is evenly distributed across the set of images.

13. The method of claim 1, further comprising:
identifying a first edge of the grid structure and a second edge of the grid structure opposite to the first edge in a first direction; and
connecting the first edge and the second edge to enable continuous navigation around the grid structure in the first direction.

14. The method of claim 13, further comprising:
identifying a third edge of the grid structure and a fourth edge of the grid structure opposite to the third edge in a second direction; and
connecting the third edge and the fourth edge to enable continuous navigation around the grid structure in the second direction.

15. The method of claim 1, further comprising:
determining a location identifier, wherein the portion of the representative set of images is displayed based on the location identifier.

16. The method of claim 15, further comprising:
assigning a bookmark to the location identifier at a first time; and
displaying the portion of the representative set of images at a second time after the first time based on the bookmark.

17. The method of claim 15, further comprising:
generating a minimap for the representative set of images; and
displaying a navigation position of the location identifier in the minimap.

18. A method for image exploration, comprising:
identifying a set of images;
reducing the set of images to obtain a representative set of images;
arranging the representative set of images in a grid structure using a self-sorting map (SSM) algorithm;
displaying a portion of the representative set of images based on the grid structure;
receiving a navigation input corresponding to an image of the representative set of images;
identifying a set of neighbor images of the image from among the set of images, wherein at least one image in the set of neighbor images is not included in the representative set of images;
arranging the set of neighbor images in a second grid structure based on the navigation input; and
displaying the set of neighbor images based on the second grid structure.

19. The method of claim 18, further comprising:
removing a neighbor image based on a proximity of the neighbor image to an image of the representative set of images, wherein the representative set of images is distributed throughout the set of images.

20. An apparatus for image exploration, comprising:
a processor;
a memory storing instructions executable by the processor;
a reduction component configured to identify a set of images and to reduce the set of images to obtain a representative set of images by removing a neighbor image based on a proximity of the neighbor image to an image of the representative set of images;
a sorting component configured to arrange the representative set of images in a grid structure using a self-sorting map (SSM) algorithm; and
a user interface configured to display a portion of the representative set of images based on the grid structure and to receive a navigation input, wherein the portion of the representative set of images is displayed based on the navigation input.

\* \* \* \* \*